United States Patent [19]
Henderson et al.

[11] Patent Number: 5,603,078
[45] Date of Patent: Feb. 11, 1997

[54] REMOTE CONTROL DEVICE WITH CREDIT CARD READING AND TRANSMISSION CAPABILITIES HAVING MULTIPLE IR LEDS

[75] Inventors: Andre D. Henderson, Rowlett; William H. Fuller, Plano; James M. Rotenberry, Richardson, all of Tex.

[73] Assignee: Spectravision, Inc., Richardson, Tex.

[21] Appl. No.: 528,690

[22] Filed: Sep. 15, 1995

[51] Int. Cl.⁶ .................................................. H04N 5/44
[52] U.S. Cl. .............................. 455/5.1; 348/734; 348/2; 348/12; 348/13; 341/176
[58] Field of Search ................... 455/5.1, 151.1, 455/151.2, 352; 341/176; 348/2, 10, 12, 13, 211, 734; 359/142, 148; 367/197

[56] References Cited

U.S. PATENT DOCUMENTS

| | | | |
|---|---|---|---|
| 4,114,099 | 9/1978 | Hollander | 348/734 |
| 4,231,031 | 10/1980 | Crowther et al. | 340/825.63 |
| 4,567,512 | 1/1986 | Abraham | 348/7 |
| 4,897,718 | 1/1990 | Testin et al. | |
| 5,325,423 | 6/1994 | Lewis | 379/90 |
| 5,336,870 | 8/1994 | Hughes et al. | 235/379 |
| 5,410,326 | 4/1995 | Goldstein | 348/734 |
| 5,420,573 | 5/1995 | Tanaka et al. | 340/825.24 |
| 5,488,411 | 1/1996 | Lewis | 348/8 |

*Primary Examiner*—John K. Peng
*Assistant Examiner*—Nathan Joseph Flynn
*Attorney, Agent, or Firm*—Haynes and Boone, L.L.P.

[57] ABSTRACT

An infrared remote control unit including an integrated card reading device. The unit is used for purchasing products or services offered via a television monitor, such that the unit transfers data to a receiver connected to a television monitor connected via at least one modem to a control computer for processing and purchase authorization. The unit includes a card reader for reading data encoded on a magnetic stripe of a card. A microprocessor operatively connected to the card reader receives and reformats the encoded data. A transmitter connected to the microprocessor transmits the reformatted data to the receiver for the purchase.

20 Claims, 3 Drawing Sheets

REMOTE CONTROL DEVICE WITH CREDIT CARD READING AND TRANSMISSION CAPABILITIES HAVING MULTIPLE IR LEDS

FIELD OF THE INVENTION

The invention relates generally to remote control devices and more specifically to a remote control device with credit card reading and transmission enhancements.

BACKGROUND OF THE INVENTION

It is well known that hospitality establishments, herein defined as hotels, motels, hospitals, rental condominiums and the like, operate in a highly competitive environment. In order to attract customers and generate additional revenue, such hospitality establishments offer a wide variety of services, including an assortment of video services. In addition to broadcast and cable television, hotels and motels often have video services systems that provide pay-per-view and video-on-demand services, as well as a variety of interactive services. Pay-per-view services are movie services broadcast at predetermined or scheduled times. The programming can be accessed by multiple television sets (TVs) at any given time while the transmission is in progress. Video-on-demand services enable customers to select one of several programs to be viewed at their convenience. Viewing times are not prescheduled and customers typically are given a choice of a large number of programming alternatives (generally from eight (8) to fifty (50) video programs). Usually the selected programming is transmitted in such a manner that only the customer who selected the programming is able to receive the broadcast. U.S. Pat. No. Re. 34,611 (Fenwick) teaches an analog video-on-demand system. With a recent advancement in the art, some video-on-demand systems provide "join-in-progress" capability so that additional customers can access and view a program initially selected by one customer. Interactive programs range from video games and interactive informational programs that describe the establishment's facilities and services. Interactive services also can allow customers to purchase goods and services from their room using the TV and the video services system and even pay their room bill and check out of the hotel with their room TV.

The current art provides several means by which consumers can pay for the pay-per-view, video-on-demand, and interactive video services. It is known in the art that a centralized computer processor for the video services system can be connected to the establishment's property management system. U.S. Pat. No. 5,077,607 (Johnson) describes the integration of a hospitality establishment's property management system and the video services system's controlling computer. The property management system contains room and bill files for each establishment customer. Typically, at check-out, the charges recorded in the room file are totaled and the file is printed as customer's bill. Because of the electronic connection between the video services system processor and the property management system, the processor is able to display billing information on the TV screen and copy video service charges into a customer's room and bill file.

U.S. Pat. No. 5,323,448 (Biggs) teaches a telephone with speed dial keys and a credit card reader. Consumers are able to use the speed dial keys to access on- and off-premises services. Consumers can pay for the on-premises services, such as room service and video-on-demand services, by using the card reader. Billing data collected by the card reader is transmitted via a telecommunications circuit to a computer that processes and stores the data. With this method, the consumer must interact with two systems, the video and the telecommunications systems. It still can be confusing for consumers to use the telephone to pay for video services, even if these systems are integrated.

Other interactive systems allow customers to use a remote control to enter data and interact with a remote processor. Customers use the room remote control unit to manually enter billing information that is received by the television or a room unit on or near the television and transmitted via the video services system to the processor. The processor receives and records the billing information and approves the transaction. Some processors also have the capability of providing real-time validation of the billing information to assure that the billing card is valid and that the account contains sufficient funds for the purchase. However, consumers cannot use the remote control unit to automatically enter their billing data. Because billing data must be entered manually, billing data transmission from the remote control unit to the infrared receiver is slow with significant opportunities for errors.

Infrared transmission technology has developed considerably over the last twenty years. U.S. Pat. No. 4,231,031 (Crowther) taught methods for receiving IR signals from remote control units to prevent signal overlaps. Ten years later, U.S. Pat. No. 4,897,718 (Testin) taught improvements to interpreting remote control signals by modifying receiver sampling of "toggle" commands (power application and muting) to increase debouncing parameters, as compared to "channel up" or "channel down" commands. These methods solve the problems of shipping simple on/off commands too rapidly, while allowing channel up/channel down commands to move more quickly.

Various data transfer techniques have been developed and transferred to the consumer electronics industry. U.S. Pat. No. 4,425,647 (Collins) is an example of how parity check can be established between a remote transmitter and receiver. However, these methods do not begin to address the problems of being able to transmit up to forty or more characters from a hand-held remote control unit in exact sequence to a remote receiver.

In order to remain competitive and maximize earning potential, hospitality facilities require payment and billing methods that make it easier and more convenient for consumers to input various types of billing data—including debit and credit cards. For this reason, it is desirable to combine card readers and infrared remote control units in such a manner that consumers can use the resulting unit to "swipe" their credit card and have the billing data transmitted via a video services system to a computer processor for validation and storage.

However, the use of a remote control unit to capture and transmit billing data presents unique problems. For example, customers often fail to point remote control units exactly at the television's infrared receiver and the data received is corrupted or incomplete. In addition, some compact florescent lights comprise switching power supplies that cause the light to be modulated at a frequency that interferes with the infrared transmissions from the remote control. Typically the photo receiver is so overwhelmed with signals that the transmissions from the remote control are often misread. This phenomenon would cause the transmission of the billing data from a remote control to be blocked or degraded.

Card reader functionality requires additional energy beyond the standard requirements of the remote control unit and can prematurely drain the remote control's power source—usually two 1.5 volt ("AA") batteries. The lack of sufficient power causes the unit to incorrectly read and transmit the billing data and increases the expense of maintaining the remote control units.

Therefore, what is needed, and what has heretofore been lacking in the art, is a remote control unit with a card reader that can reliably read and transmit credit card or debit card data to an infrared receiver resident in the TV or a room unit adjunct to the TV.

SUMMARY OF THE INVENTION

The present invention, accordingly, provides a video services system that incorporates a remote control unit with a card reader that can reliably read and transmit card data to an infrared receiver resident in a TV or a room unit adjunct to the TV, that overcomes or reduces disadvantages and limitations associated with prior systems.

In one aspect, elements of a remote control magnetic stripe card reader are incorporated into an infrared remote control unit. Other unique alterations have been made to the remote control unit that enable it to more effectively transmit billing data to an infrared receiver. Logic has been added to the microprocessor which enables it to format and encode the data received from the credit or debit card's magnetic stripe with an error correcting algorithm.

In another aspect, at least one additional infrared light emitting diode (LED) is added to the unit. The extra LED is activated only when the credit or debit card data is being transmitted. With the use of an extra LED, the range and effectiveness of the remote control unit's transmission capability are increased. In addition, the frequencies of the standard chopper signals utilized to transmit the billing data are the same frequency as those of the infrared receiver, thus decreasing the possibility that the signal will be corrupted by signals from other sources, e.g., fluorescent light bulbs.

A power trip switch also is added to the remote control so that power is not provided to the card reader elements unless a card is being swiped across the magnetic stripe sense head. In one embodiment, the extra LEDs used for transmitting billing card data are activated by the power trip switch.

In one embodiment the invention is an apparatus for purchasing products or services offered via a television monitor using a remote control unit that transfers data to a receiver connected to the television monitor, the receiver connected via at least one modem to a control computer for purchase authorization. The apparatus includes a card reader connected to the remote control unit for reading the data encoded on a magnetic stripe of a card, a microprocessor operatively connected to the card reader for receiving and reformatting the encoded data, and circuitry connected to the microprocessor for transmitting the reformatted data to the receiver for said purchase.

A technical advantage achieved with the invention is that magnetic stripe card reader functionality is incorporated into a remote control unit for reading and transmitting billing data to a video services system, thereby facilitating operation of a video services system.

A further technical advantage achieved is conservation of battery power by the remote control card reader whereby the functional elements of the card reader do not receive power until a card is swiped through the provided slot.

A further technical advantage achieved with the invention is that the billing data is broken into packets and encoded with an error correction algorithm, and transmitted multiple times, thus increasing the probability that all the data will be received by the infrared receiver.

A further technical advantage achieved with the invention is that the card swipe slot can be used to input programs stored on a magnetic stripe into a programmable card reader.

BRIEF DESCRIPTION OF THE DRAWINGS

FIG. 4b is a cross-sectional view of the card reader taken along line A—A of FIG. 4a.

FIG. 4c is a cross-sectional view of the card reader taken along line B—B of FIG. 4a.

DETAILED DESCRIPTION OF THE INVENTION

Figure 1:
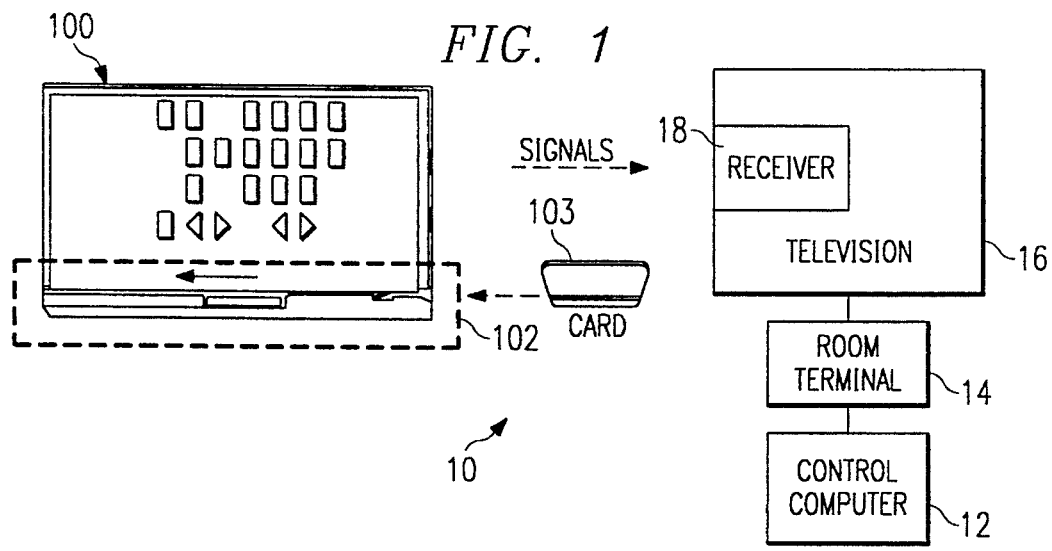
FIG. 1 is a schematic block diagram of a video services system of the present invention that includes a remote control unit with an integrated card reader slot.

In FIG. 1 the reference numeral 10 refers to a video services system of the present invention, for use in hospitality establishments, herein defined as hotels, motels, hospitals, condominiums and the like. The system 10 includes a control computer 12 that is utilized to provide video programming, via a room terminal 14, to a plurality of televisions 16 within an establishment. While not shown, it is understood a modem is provided between the room terminal 14 and the control computer 12 for converting signals from analog-to-digital and digital-to-analog between the television 16 and the control computer 12.

A receiver 18 is connected to the room terminal 14, either directly or through the television 16. A remote control unit 100 sends signals to the receiver 18 for controlling the ordering, and payment for, the video programming. It is understood that the video programming may include, inter alia, pay-per-view entertainment, video on-demand services and any variety of interactive services. The remote control unit 100 is also used to respond to interactive services and programs received by the television 16, including services that allow system users to inspect and pay their hotel bills.

The remote control unit 100 incorporates a magnetic stripe card reader 102 for reading a credit or debit card 103. As explained in detail below, the card reader 102 enables a user of the system 10 to pay for video programming utilizing the card 103, wherein the number of the card is automatically transmitted by the unit 100 to the receiver 18 and processed in the control computer 12.

While not shown, it is understood that the system 10 includes a plurality of televisions 16 within a hospitality environment. The television 16 and/or the control computer 12 are connected via a coaxial or fiber wire distribution network (not pictured) to a video source. The television 16 or its room terminal 14 functions as a radio frequency (RF) modem and as a tuner. The video source (not shown) connected to the control computer 12 is understood to comprise a variety of elements, including head end equipment for receiving standard broadcast television or cable television signals (not shown); equipment for receiving satellite transmissions (not shown); and other video storage equipment (not shown) including a video server. The control computer 12 is able to interface with a computerized property management system (PMS) of the environment (also not shown). It is understood that billing data that is read and transmitted by unit 100 is ultimately processed by the control computer 12, for validation, storage and/or transmission to a customer's room file within the PMS (not shown). It should also be understood that the unit 100 is used to purchase a variety of types of goods and services including video-on-demand video services from video programming stored in a video server (not shown) operatively connected to the control computer 12. The remote control unit 100 further has utility with other system configurations. The transfer of data received from the unit 100 by the room terminal 14 is described in terms of RF transmission to the computer 12. In another embodiment, the room terminal 14 transmits the data to the computer 12 via digital signals.

Figure 2:
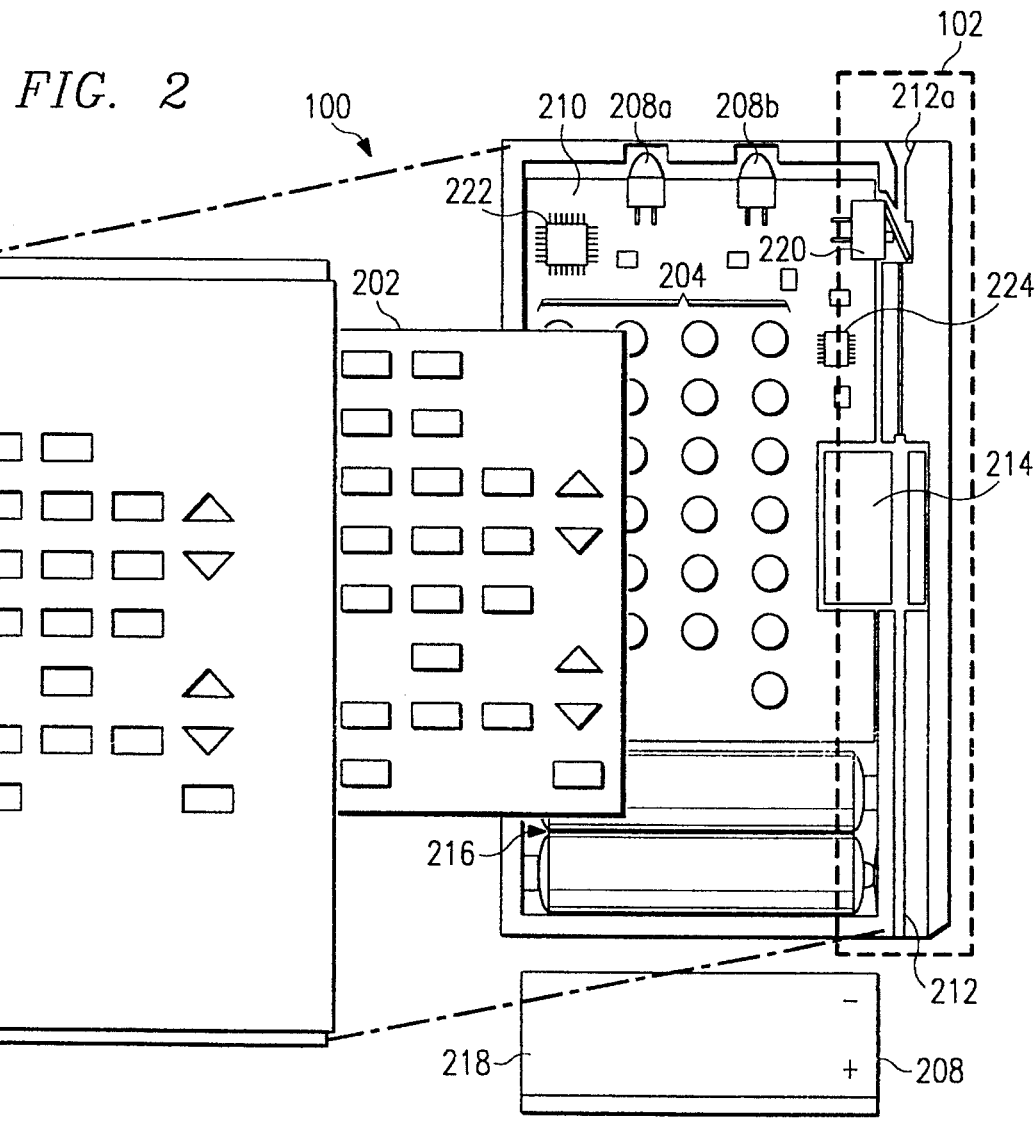
FIG. 2 is an enlarged, exploded schematic diagram of the remote control unit of FIG. 1.

Referring to FIG. 2, the remote control unit 100 includes a conventional numeric keypad 202 for the selective engagement of switch contacts 204. A plastic shield 206 covers the keypad 202 and forms part if the housing of the unit 100. The keypad 202 contains keys common to remote control units used for TVs, including volume control keys, channel changing direction keys, and optionally also contains VCR command keys such as "pause," "rewind," and "fast forward." Two infrared light emitting diodes (LEDs) 208a, 208b for transmitting signals generated by the keypad 202 and by the reader 102, as described below, are mounted to a printed circuit board 210 within the unit 100.

Figure 5:
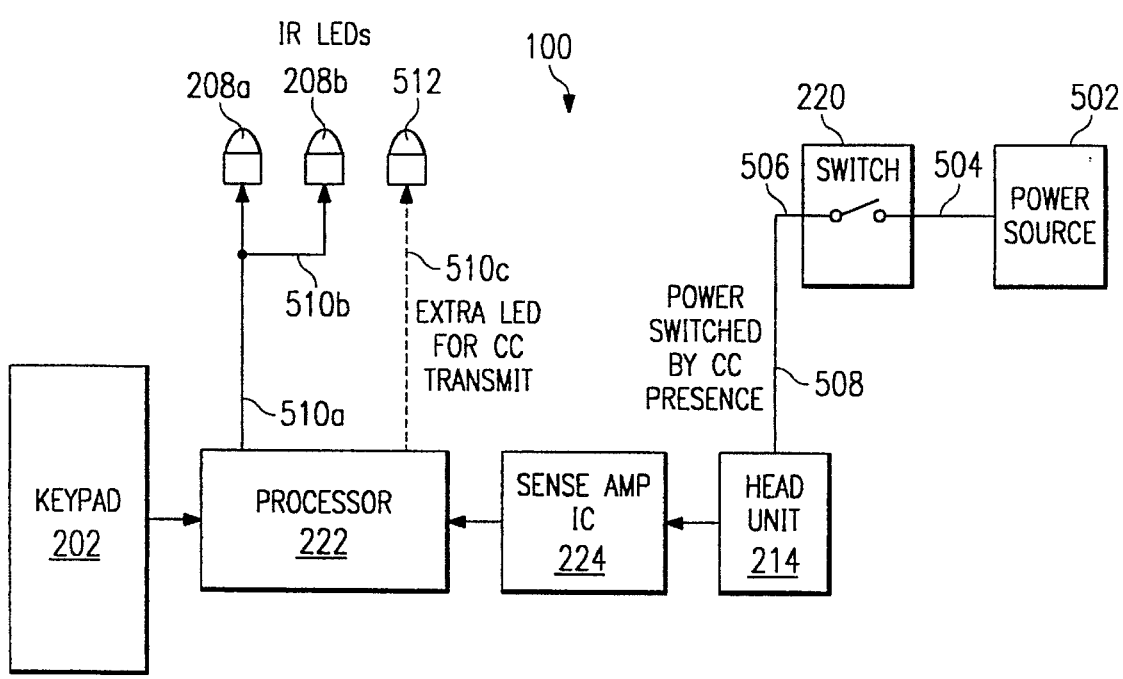
FIG. 5 is a schematic block diagram of components of the remote control unit of FIG. 1.

The reader 102 includes a card swipe slot 212 located along a side of the unit 100, such that the slot opens toward the top, i.e., keypad side, of the unit 100. Alternatively, the slot 212 may open along a side edge of the unit 100, as illustrated in FIGS. 4–6, discussed below. The slot 212 can be as deep as 0.75 inches thereby allowing more than one-third of the card 103—including the entire magnetic stripe—to engage in the slot. It is understood that the magnetic stripe of the card 103 can contain different data tracks containing alternatively formatted data. For example, a first track typically contains data in a format known as 1.A.T.A.; a second track typically contains data in a format known as A.B.A; and a third track typically contains data used for automatic teller functionality. The data stored on the card 103 used by the system 10 is typically that necessary for processing a billing transaction of a bank or credit card and is stored on the first two tracks of the card. However, the card reader 102 as described herein can also read other types of cards and formats, including magnetic stripes with less data and fewer tracks.

A magnetic head unit 214 is included as part of the reader 102 for reading the information stored on the magnetic stripe tracks of the card 103. Batteries 216 are contained within a cavity of the remote control unit 100, beneath an access cover 218, for supplying power to components of the unit 100, including the head unit 214. A power trip switch 220 is located on the board 210 adjacent the slot 212, in proximity to an open end 212a of the slot. As the card 103 is drawn into the slot 212 the card engages and closes the switch 220, causing power from the batteries 216 to be furnished to the head unit 214, thereby enabling the head unit to read the card. The switch 216 activates delivery of power to the head unit 214 for a time sufficient to read the card 103, after which power delivery is discontinued. A circuit (not shown) connecting the head unit 214 to the power source, i.e., the batteries 216, is interrupted at the switch 220, and is activated so that the head unit 214 receives power only when the swiped card activates the switch 108. The head unit 214 is a beam style read head apparatus that reads the card 103, particularly the forty decimal digit data or otherwise discretionary data that is magnetically encoded on the card's magnetic stripe.

A microprocessor 222 and a sense amplifier 224 are connected by a circuit (not shown) to the head unit 214. The sense amplifier 224 receives and temporarily buffers the data read from the card 103 and, in addition, produces a control signal that informs the microprocessor 222 of the presence of new data in its buffers (not shown). The microprocessor 222 controls the functionality of the remote control unit 100. It receives data input both from the keypad 202 and the head unit 214. The microprocessor 222 contains programming that segregates the data of the card 103 into separate data packets and synchronizes the packets for transmission. In addition, error correction algorithm data are added to each packet.

The microprocessor 222 transmits the encoded data to the infrared LEDs 208a, 208b. In a preferred embodiment, the LEDs 208a, 208b transmit data at an infrared frequency of 37.94 khz. Most standard remote control units transmit signals at frequencies between 35 and 40 kilohertz. The unit 100 also can be configured to transmit data at frequencies other than 30 to 40 kilohertz. The LED 208a represents one or more infrared LEDs that customarily are utilized to transmit standard remote control commands, e.g., channel and volume information, to the receiver 18. The LED 208b represents one or more infrared LEDs that are activated by the microprocessor 222 for transmitting the encoded card data. Both the LEDs 208a and 208b are utilized when transmitting the data packets, augmenting the directional target and the strength of the infrared signals, thus increasing the probability that all the data within the data packets will be correctly received by the receiver 18. Also to enhance reception, the four packets of data mentioned above are transmitted three times. The entire sequence beginning with reading of the card 103 and culminating with the three transmissions of the four packets of data transpires in approximately 0.5 seconds.

Figure 3A:
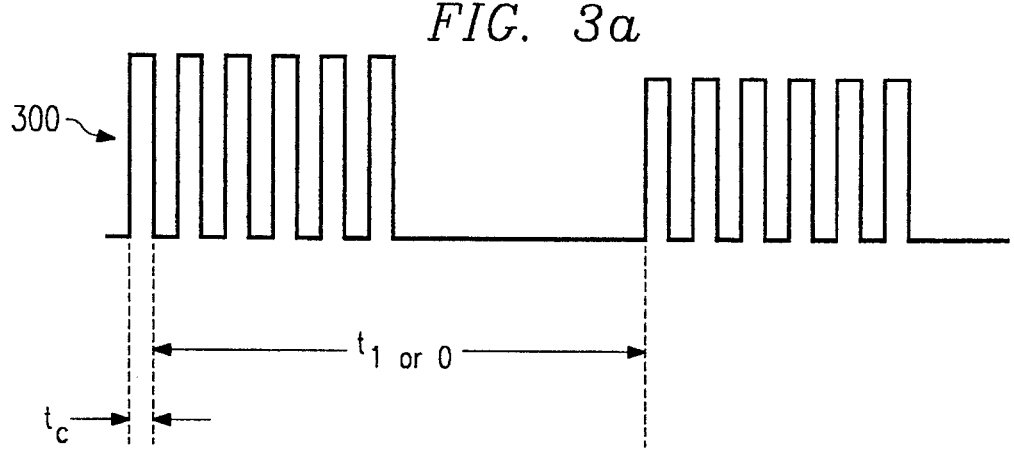
FIGS. 3a and 3b are graphic illustrations of a chopper frequency signal generated by the remote control unit of FIG. 1 and a square wave frequency signal generated by a receiver of the system of FIG. 1, respectively.
Figure 3B:

Referring to FIGS. 3a and 3b, it is understood that the unit 100 utilizes on-off transmission bursts of infrared light, known as chopper frequencies (illustrated by the waveform 300 in FIG. 3a), to transmit data that is input from the use of the keypad 202. When transmitting data input from use of the card 103 in the card reader unit 102, the unit 100 also utilizes a chopper frequency. A series of timed on-off bursts, followed by periods of inactivity, define whether the bit of information being transmitted is the bit "1" or "0." For example, the chopper frequency illustrated by the waveform 300 in FIG. 3a, represents a "1." The time "$t_c$" represents the time duration of a chopper signal, which typically is about 26 milliseconds in duration. In addition, a tank circuit (not shown) of the receiver 18 is tuned to the chopper frequency transmitted by the unit 100. This frequency synchronization significantly decreases the probability of interference from other items that emit infrared light, such as compact florescent light bulbs. FIG. 3b illustrates the correlation between the correlation between the chopper signals and the data received by the signals corresponding to the chopper signals in FIG. 3a. Specifically, a waveform 302 represents the chopper signals 300 in FIG. 3a comprising a "1" bit.

In an alternative embodiment, the programming resident in the microprocessor 222 can execute the functionality of the power trip switch 220, thus eliminating the need for the switch 220, and requiring only a sensor to detect the presence of the card 103 in the slot 212.

Before activation of the switch 220, the card reader 102 receives only a minimal amount of current (for example, 0.09 microamps), as necessary to detect the presence of the magnetic stripe of the card 103 in the slot 212. This minimal current is informally referred to in the industry as "quiescent" current. Once the presence of the card 103 is detected in the slot 212, either the switch 220 or programming in the microprocessor 222 initiates application of additional power to the reader 102 so that the head unit 214 can be activated to read the card 103.

As an additional alternative, the microprocessor 222 can be programmed to preface the billing data transmission by causing the LEDs 208a and 208b to first transmit a short pulse of a higher intensity, also referred to as a "leader pulse." This pulse is received by the receiver 18 and is interpreted by appropriately programmed microprocessors (not shown) within the television 16 as a signal to automatically boost the gain of the receiver. In this manner, the receiver 18 will more likely receive the following data transmission. This technique is especially helpful in a setting in which compact florescent light bulbs are utilized to provide room lighting, because florescent light bulbs comprise switching power supplies that cause the light to be modulated at a frequency similar to the infrared frequencies of the remote control unit 100's transmissions. This technique will increase the probability that the infrared receiver 18 will correctly receive the data transmitted by the unit 100 despite the presence of interfering frequencies.

In a preferred embodiment, the remote control unit 100 is about 5.875 inches long and 3.285 inches wide. Clearly, larger or smaller units also can be designed and used. If the card reader 102 alternatively has a slot 212 that opens to a side of the unit 100, the width of the unit is about 0.785 inches. The width of the unit 100 must be increased if the card reader slot and components are placed on top of the unit.

Figure 4A:
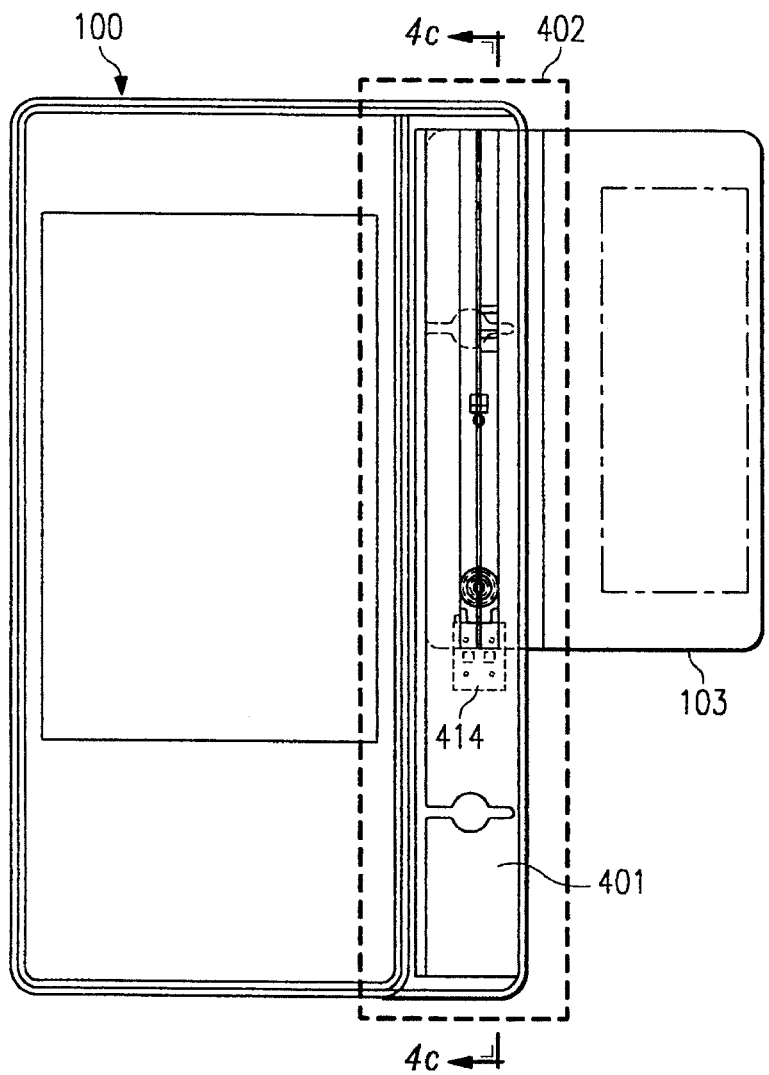
FIG. 4a is an enlarged, front elevation view of the remote control unit of FIG. 1, illustrating details of a card reader head assembly thereof.
Figure 4C:
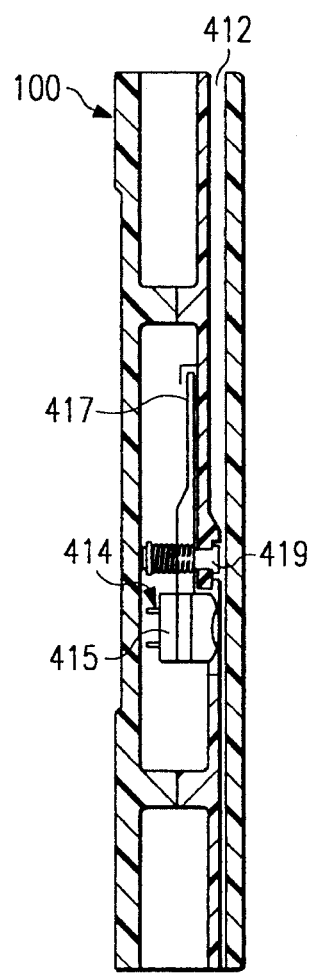
Figure 4B:
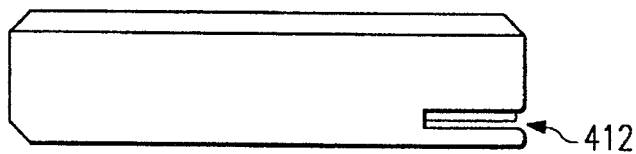

Referring to FIGS. 4a, 4b, and 4c, an alternative card reader 402 is shown incorporated as part of the remote control unit 100. The reader 402 is the same as the reader 102 (FIG. 1) except that a card swipe slot 412 is located on a side of the unit 100 instead of on the top of the unit. A head unit 414, similar to the unit 214 (FIG. 2) is positioned to read the card 103. In this embodiment, as the card 103 is drawn through the slot 412 past the head unit 414, only tracks one and two of the four tracks of a characteristic bank card 103 are read. Typically tracks one or two of the card 103 tracks containing the information necessary for processing a transaction.

As shown in FIG. 4a, a bracket 401 is attached to the back of the unit 100 so that the unit can be mounted to a surface, e.g., a night stand in a hotel room.

As shown in FIG. 4c, the head unit 414 includes a read head 415 for reading the magnetically encoded data from the card 103. The dimensions of the head 415 are typically 13.75 millimeters by 10.36 millimeters. A beam 417 connects the head 415 to the housing of the unit 100 with a spring-loaded anchor pin 419. The pin 419 also serves as a fulcrum point from which the reader head 415 pivots from an "at rest" position blocking the slot 412 to a "read position" wherein the head is moved from the slot 412 by the card 103. The spring-loading of the pin 419 provides resistance to the beam 417, causing the head 415 to press firmly against the card 103's magnetic stripe at a pressure of about 0.38 to 0.5 pounds. The spring-loading of the pin 419 also causes the head 415 to return to the "at rest" position.

FIG. 5 is a schematic flow diagram of the remote control unit 100 illustrating its operation. In operation, the card 103 (FIG. 1) closes the switch 220 so that a power source 502 (e.g., batteries 216) is connected via lines 504, 506 and circuit 508 to the head unit 214. With power applied to the head unit 214, the head unit reads the magnetically encoded data present on the magnetic stripe of the card 103 and outputs that data in a digital format to the sense amplifier 224. In this manner, the card reader 102 only receives power when it is being utilized and power from the power source 502 is not unnecessarily consumed. It is understood, however, that the power source supplies uninterrupted power to other portions of the unit 100, as needed.

The processor 222 controls a circuit or circuits (not shown), connected on lines 510a, 510b, 510c to the infrared LEDs 208a, 208b, and a third LED, 512. The processor 222 receives input both from the keypad 202 and, via the sense amplifier 224, from the head unit 214. After the card data is read, the head unit 214 outputs the data to the sense amplifier 224, which contains limited buffer capability to temporarily store the card data. The sense amplifier 224 also functions to generate a control signal that is output to the processor 222. After receiving the control signal, the processor 222 sets an internal clock (not shown) to synchronize the inputted card data received from the sense amplifier 224. The processor 222 also functions to encode the card data. Typically, the head unit 214 reads forty decimal digits of data magnetically encoded on the magnetic strip. This data is stored in the processor 222 as twenty bytes of binary coded decimal data. The processor 712 separates the card data into four data packets (or data "strings"), each packet consisting of ten nibbles of data. At this point, each of the original forty decimal digits now comprises one nibble (four bits) of data.

The processor 222 then adds one nibble of synchronization data to each of the four data packets so the card data can be correctly reconstructed when inputted by the infrared receiver. In addition, error correction algorithm data are added to each packet. In the preferred embodiment, a Reed-Solomon error correcting code consisting of four nibbles of data is utilized for each packet. Reed-Solomon codes are known by the art to have multiple-burst-correcting capability. Its decoding algorithm has a symbol field that is identical to the error locator field. Initially, Reed-Solomon codes were used for military tactical communications. Please see, for example, Djimitri Wiggert, *Codes for Error Control and Synchronization* (1988) for a discussion of Reed-Solomon codes. In addition to the use of an error correcting algorithm, the processor 222 outputs for transmission each packet of data three times. The use of the error-correcting code and the multiple transmission of the data packets insure that the billing card data received by the infrared receiver is complete and that occasional minor transmission errors can be corrected by the algorithm.

The processor 222 outputs data to the LEDs 208a, 208b, and 512. LEDs 714 *a–b* represent the infrared LEDs utilized to transmit customer commands that are inputted with the keypad 718. The LED 512 is utilized when transmitting billing data to increase the strength and the range of the infrared signals. The LEDs 208a, 208b, 512 output the data utilizing chopper frequencies as described with respect to FIGS. 3a, 3b. In an alternative embodiment, the LED 512 is activated by the switch 220 instead of the processor 222. The receiver 18 receives the signals from the LEDs 208a, 208b, 512, whereupon the data is transmitted to control computer 12. In one embodiment, prompts are displayed on the television 16 verifying that the information has been received. The billing information also can be displayed on the television 16, allowing the user to verify that the information received by control computer 12 is correct.

In one embodiment the remote control unit 100 is programmed with instructions to communicate specific infrared frequencies to the room terminal 14 or the receiver 18. The head unit 214 can be used to read programs stored on magnetic strips of plastic cards that instruct the processor 222 to make changes such as to vary infrared output instructions. The processor 222 includes program storage and modification capacity.

Referring now to the programmability of the card reader unit 100, instructions to communicate specific IR frequencies, for transmission to a room terminal 14 or a receiver 18, may be included. The head unit 214 can be used to read programs stored on magnetic media attached to plastic cards, for example. These programs instruct the processor 222 to make changes such as to vary IR output instructions. The processor 222 includes means for program storage and means for modifying stored programs.

It is understood that the referral to the processor 222 in the text could be a referral to a microcontroller.

It is understood the control computer 12 is capable of receiving data from the card 103 in a variety of formats, including custom formats for use in the system 10 to keep track of frequent use and payment for services based upon frequent use promotional programs. In addition the card reader unit 100 can be utilized to read identification cards such as state driver's licenses with magnetic stripes. The control computer 12 can use this material to determine the age of the customers and appropriately restrict adult video entertainment from underage users. The control computer 12 also can use this data to generate graphic "help" prompts that are transmitted and displayed on the TV.

In an alternative embodiment, the remote control unit 100 is a stationary unit that is fixed to a pedestal to a night stand near or between the room beds. Because it is fixed, the unit 100 in this embodiment utilizes electrical current from a wall plug as the power source 210.

It is understood that variations may be made in the present invention without departing from the spirit and scope of the invention. For example, different dimensions can be used for the remote control unit and the card reader slot and components without altering the invention. Likewise, the card reader slot and components can be placed at different locations on the remote control unit that those disclosed herein. It is also possible to use error decoding algorithms other than Reed-Solomon codes to encode data for output to the infrared receiver.

Even though the preferred embodiment of the invention is a component of a hospitality establishment video services system, it is anticipated that the present invention will be used as a component element of other types of transmission systems. For example, the invention as disclosed could be utilized as part of a residential video services system wherein the card reader functionality was used to purchase pay-per-view programming, or goods and services advertised on shopping channels. The residential system would have to contain an "upstream" modem, such as the room unit, to transmit the billing data to a centralized computer for validation and storage.

Although illustrative embodiments of the present invention have been shown and described, a latitude of modification, change and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. Apparatus for purchasing products or services offered via a television monitor using a remote control unit that transfers data to a receiver connected to said television monitor, said receiver connected via at least one modem to a control computer for purchase authorization, said apparatus comprising:

a card reader connected to said remote control unit for reading said data encoded on a magnetic stripe of a card;

a microprocessor operatively connected to said card reader for receiving and reformatting said encoded data; and at least two LEDs electrically connected to said microprocessor for transmitting said reformatted data to said receiver for said purchase, wherein at least one of said at least two LEDs is activated only for said transmission of said formatted data to said receiver.

2. The apparatus of claim 1 further comprising means for detecting the presence of said card in said card reader, where upon said detection, full power is applied to said card reader.

3. The apparatus of claim 1 wherein said receiver is connected to said television monitor via a room unit.

4. The apparatus of claim 1 wherein said reformatted data is arranged for transmission in packets formatted with error correction algorithms.

5. The apparatus of claim 4 wherein said error correction algorithm is a Reed-Solomon error correcting code.

6. The apparatus of claim 1 wherein said reformatted data is transmitted by said transmitting means more than once.

7. The apparatus of claim 1 wherein instructions for programming said microprocessor are stored on a magnetic stripe of a card and are input to said microprocessor via said card reader.

8. The apparatus of claim 1 wherein said card is a credit or debit card.

9. The apparatus of claim 1 wherein said card is a frequent customer account card.

10. The apparatus of claim 1 wherein said product or service is a pay-per-view video program.

11. A method for purchasing products or services offered via a television monitor using a remote control unit that transfers data to a receiver connected to said television monitor, said receiver connected via at least one modem to a control computer for purchase authorization, said method comprising:

reading said data encoded on a magnetic stripe of a card;

receiving and reformatting said encoded data; and transmitting said reformatted data to said receiver for said purchase using two LEDs, wherein one of said two LEDs is activated solely for effecting said transmitting.

12. The method of claim 11 further comprising detecting the presence of said card in said remote control unit, where upon said detection, full power is applied to said unit.

13. The method of claim 11 wherein said receiver is connected to said television monitor via a room unit.

14. The method of claim 11 wherein said reformatted data is arranged for transmission in packets formatted with error correction algorithms.

15. The method of claim 14 wherein said error correction algorithm is a Reed-Solomon error correcting code.

16. The method of claim 11 wherein said reformatted data is transmitted more than once.

17. The method of claim 11 wherein said card is a credit or debit card.

18. The method of claim 11 wherein said card is a frequent customer account card.

19. The method of claim 11 wherein said product or service is a pay-per-view video program.

20. Apparatus for purchasing products or services offered via a television monitor using a remote control unit that transfers data to a receiver connected to said television monitor, said receiver connected via at least one modem to a control computer for purchase authorization, said apparatus comprising:

a card reader connected to said remote control unit for reading said data encoded on a magnetic stripe of a card;

a microprocessor operatively connected to said card reader for receiving and reformatting said encoded data;

at least two LEDs electrically connected to said microprocessor for transmitting said reformatted data to said receiver for said purchase, wherein at least one of said at least two LEDs is activated only for said transmission of said formatted data to said receiver; and means for detecting the presence of said card in said card reader, where upon said detection, full power is applied to said card reader.

* * * * *